(12) United States Patent
Suzuki et al.

(10) Patent No.: US 8,808,889 B2
(45) Date of Patent: Aug. 19, 2014

(54) SEALED BATTERY AND MANUFACTURING METHOD THEREOF, AND VEHICLE AND DEVICE HAVING THE SAME MOUNTED THEREON

(75) Inventors: Satoshi Suzuki, Toyota (JP); Katsumi Ito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 159 days.

(21) Appl. No.: 13/262,260

(22) PCT Filed: Apr. 13, 2009

(86) PCT No.: PCT/JP2009/057441
§ 371 (c)(1),
(2), (4) Date: Sep. 30, 2011

(87) PCT Pub. No.: WO2010/119497
PCT Pub. Date: Oct. 21, 2010

(65) Prior Publication Data
US 2012/0019175 A1 Jan. 26, 2012

(51) Int. Cl.
*H01M 2/36* (2006.01)
*H01M 2/12* (2006.01)
*H01M 2/08* (2006.01)

(52) U.S. Cl.
CPC ............ *H01M 2/365* (2013.01); *H01M 2/361* (2013.01); *H01M 2/362* (2013.01); *H01M 2/12* (2013.01); *H01M 2/08* (2013.01); *Y02E 60/12* (2013.01)
USPC ............ 429/72; 429/139; 429/163; 429/175; 429/180; 429/185

(58) Field of Classification Search
CPC ....... H01M 2/1235; H01M 2/08; H01M 2/12; H01M 2/361; H01M 2/362; H01M 2/365; Y02E 60/12
USPC ............ 429/72, 82, 139, 163, 171, 175, 176, 429/180, 185
See application file for complete search history.

(56) References Cited

U.S. PATENT DOCUMENTS 6,455,193 B1    9/2002 Miyazaki et al.

FOREIGN PATENT DOCUMENTS

| JP | 11-111245 | 4/1999 |
|---|---|---|
| JP | 2000-268811 | 9/2000 |

(Continued)

OTHER PUBLICATIONS

International Search Report in International Application No. PCT/JP2009/057441; Mailing Date: Jul. 14, 2009.

*Primary Examiner* — Patrick Ryan
*Assistant Examiner* — Ben Lewis
(74) *Attorney, Agent, or Firm* — Finnegan, Henderson, Farabow, Garrett & Dunner, LLP

(57) ABSTRACT

The sealed battery has a battery container (4, 5) and a power generating element sealed inside the battery container. The battery container is provided with a fill opening (12), an annular ridge (16), which extends around the entire circumference of the outer face surrounding the fill opening, and an annular indentation (15) on the inside of the inner wall surface of the annular ridge, and has a sealing cap (8), which fits into the annular indentation and covers the fill opening. The sealing cap is joined by being welded to the inner wall surface of the annular ridge around the entire circumference at the edge thereof. Since heat is not well transferred from the inside to the outside of the outer wall surface of the annular ridge, the effective thermal capacity during welding is mostly determined by the structure of the area inside the outer wall surface of the annular ridge. Consequently, the effective thermal capacity is nearly uniform independent of direction. Thus, it is possible to provide a sealed battery, a manufacturing method thereof, and vehicles and machinery in which the same is installed, wherein the opening can be closed under consistent welding conditions around the entire circumference.

16 Claims, 8 Drawing Sheets

(56) References Cited

FOREIGN PATENT DOCUMENTS

| | | | |
|---|---|---|---|
| JP | 2006-40690 | 2/2006 | |
| JP | 2006-040690 | * 2/2006 | .............. H01M 2/36 |
| JP | 2006-324108 | 11/2006 | |
| JP | 2007-66600 | 3/2007 | |
| JP | 2007-103158 | 4/2007 | |
| JP | 2007-323860 | 12/2007 | |
| JP | 2008-529222 | 7/2008 | |
| WO | WO 2006/083811 A2 | 8/2006 | |

* cited by examiner

CX: Comparative EXAMPLE
EX: EXAMPLE

CX: Comparative EXAMPLE
EX: EXAMPLE $\dfrac{W1}{D1} \times 100$

SEALED BATTERY AND MANUFACTURING METHOD THEREOF, AND VEHICLE AND DEVICE HAVING THE SAME MOUNTED THEREON

CROSS-REFERENCE TO RELATED APPLICATIONS

This is a national phase application based on the PCT International Patent Application No. PCT/JP2009/057441 filed on Apr. 13, 2009, the entire contents of which are incorporated herein by reference.

TECHNICAL FIELD

The present invention relates to a sealed battery having a power generating element hermetically sealed inside a battery container. More particularly, it relates to a sealed battery and a manufacturing method thereof, wherein an opening for introducing liquid, for example, into the battery container is provided in part of the container and this opening is closed with a cap after the introduction of liquid or the like. The invention also relates to a vehicle and a device having such a sealed battery mounted thereon.

BACKGROUND ART

Conventionally, lithium ion secondary batteries and the like, for example, commonly use a structure wherein a battery container accommodating therein a power generating element is hermetically sealed. The battery container is provided with an opening because of the necessity to introduce liquid or the like into the container. This opening in a lid member will eventually be closed. One battery container for this type of sealed battery has a container body with an open end and a lid member closing that. In this case the above-mentioned opening for introducing liquid or the like is typically provided in the lid member.

Patent Document 1 is one example of the above. In the technique of Patent Document 1, a flat-shaped sealed battery is provided with a circular opening in a lid member for introducing liquid electrolyte. A sealing member is welded to this opening to close it after the liquid has been introduced. This welding is performed around the entire circumference of the sealing member. This is done in an attempt to provide a reliable hermetic seal for the opening.

RELATED ART DOCUMENTS

Patent Documents

Patent Document 1: JP 2006-324108A

DISCLOSURE OF THE INVENTION

Problems to be Solved by the Invention

However, the above-described conventional technique had the following problem. In the technique of Patent Document 1, the opening in a flat-shaped sealed battery is closed as described above. Since the sealed battery is flat-shaped, the lid member obviously has a generally rectangular overall shape. Therefore, the distance from the circumference of the opening to the periphery of the lid member varies depending on the direction. This in turn means that the effective thermal capacity of the lid member during welding varies depending on the direction. The quality of weld points therefore varies depending on the direction.

In a direction to the long side of the flat shape, for example, the distance from the circumference of the opening to the periphery of the lid member is short. Therefore, part of input heat readily escapes to the atmosphere, whereby the temperature rises slowly. In other words, the effective heat capacity is large. On the other hand, in a direction to the short side of the flat shape, the distance from the circumference of the opening to the periphery of the lid member is long. Therefore, heat does not readily escape and the temperature rises quickly. In other words, the effective heat capacity is small.

Under such circumstances, when welding conditions are set on the basis of the part where the temperature rise is slow, spatter occurs in the part where the temperature rise is quick due to overheating, which in turn leads to insufficient strength because of thickness reduction. On the other hand, when welding conditions are set on the basis of the part where the temperature rise is quick, the weld penetration is not deep enough in the part where the temperature rise is slow, which also leads to insufficient strength. Namely, it is not possible to satisfy the requirements for both of these parts under constant welding conditions. The welding conditions could be changed in accordance with the direction, but it is not easy in actuality. It is difficult to achieve target results since the welding is largely affected by machining precision and assembling precision of various components.

The distance from the circumference of the opening to the periphery of the lid member is not the only cause of this problem. The lid member of this type of sealed battery is typically provided with other structures such as terminals and safety vent other than the electrolyte liquid fill opening. The presence of these parts also affects the effective thermal capacity. Therefore the speed of temperature rise is different between directions where these parts exist in vicinity and directions where they do not. This problem does not exclusively occur in flat-shaped batteries, either. A cylindrical battery would have the same problem if it had its opening away from the center of the lid member. The same problem also occurs due to the presence of other structures.

The present invention was devised to solve the problem encountered by the conventional technique described above. Namely, its object is to provide a sealed battery that allows closure of its opening under constant welding conditions around the entire circumference, a manufacturing method thereof, and further a vehicle and a device having this sealed battery mounted thereon.

Means of Solving the Problems

To solve the above problem one aspect of the invention provides a sealed battery including: a battery container; and a power generating element sealed inside the battery container, wherein the battery container is provided with an opening, an annular ridge extending around an entire circumference on an outer face of the opening, and an annular recess inside an inner wall surface of the annular ridge, the battery further includes a sealing member fitted into the annular recess to cover the opening, and the sealing member is joined by welding along an entire circumference thereof to the inner wall surface of the annular ridge.

In this sealed battery, when connecting the sealing member for closing the opening to the battery container, the sealing member is fitted into the annular recess inside the inner wall surface of the annular ridge. The sealing member is joined by welding along the entire circumference thereof to the inner wall surface of the annular ridge. Part of the heat input to a weld point during this welding flows in directions away from the opening through the battery container. Here, because of the annular ridge provided to the battery container, the container has a smaller thickness outside an outer wall surface of the annular ridge so that heat is transferred less easily. Therefore, the effective thermal capacity during welding is substantially determined by the structure inside the outer wall surface of the annular ridge and not significantly affected by the parts outside the outer wall surface. Accordingly, the effective thermal capacity is substantially uniform in all directions irrespective of the structure of parts outside the outer wall surface of the annular ridge. Thus the opening can be closed under optimal constant welding conditions around the entire circumference, whereby weld quality does not vary depending on the direction.

This sealed battery should preferably include an annular groove outside an outer wall surface of the annular ridge. Forming such a groove in the battery container enables formation of the outer wall surface of the annular ridge.

In this sealed battery, preferably, an outer wall surface of the annular ridge is an inclined surface configured so that the ridge has a smaller diameter at a top and a larger diameter at a bottom. With the outer wall surface being an inclined surface, the annular ridge can have a large thickness at the bottom to some extent without having a very large thickness at the top. Thereby, certain strength can be secured for the annular ridge without compromising the uniformity of weld quality. The difference in radius between the top and the bottom of the inclined surface is equal to or more than 10% of a height of the inner wall surface of the annular ridge.

In this sealed battery, preferably, a radial width at a top of the annular ridge is smaller than a height of the inner wall surface of the annular ridge. If the annular ridge is too thick at the top, the outer wall surface of the annular ridge will be too far away from the weld point, in which case the effect of the annular ridge cannot be sufficiently achieved. The height of the outer wall surface of the annular ridge is within a range of 40% to 100% of a height of the inner wall surface of the annular ridge. The height of the outer wall surface of the annular ridge here refers to the depth of an annular groove when such is formed on the outside of the outer wall surface of the annular ridge. If this groove is too shallow, the effect of the annular ridge will be unsatisfactory, whereas if it is too deep, it will affect the strength of the battery container.

In this sealed battery, further, an annular groove extending around the entire circumference of the opening may also be provided in an inner face, radially outside a position directly behind the inner wall surface of the annular ridge. Thereby, the effect of making the thermal capacity uniform by providing resistance to heat transfer will be achieved also on the inner face.

Another aspect of the present invention provides a method of manufacturing a sealed battery having a power generating element sealed inside a battery container, wherein the battery container including an opening, an annular ridge extending around an entire circumference on an outer face of the opening, and an annular recess inside an inner wall surface of the annular ridge, the method including: fitting a sealing member for covering the opening into the inner wall surface of the annular ridge; and joining the sealing member to the inner wall surface of the annular ridge by welding along an entire circumference of the sealing member.

The present invention is also directed to a vehicle including: a motor for driving wheels with electric power supplied thereto; and a power source part for supplying electric power to the motor, the power source part including the aforementioned sealed battery. Further, the invention is directed to a device including: an operating part operating with electric power supplied thereto; and a power source part for supplying electric power to the operating part, the power source part including the aforementioned sealed battery.

Effects of the Invention

According to the present invention, there are provided a sealed battery that allows closure of its opening under constant welding conditions around the entire circumference, a manufacturing method thereof, and further a vehicle and a device having this sealed battery mounted thereon.

MODE FOR CARRYING OUT THE INVENTION

Figure 1:
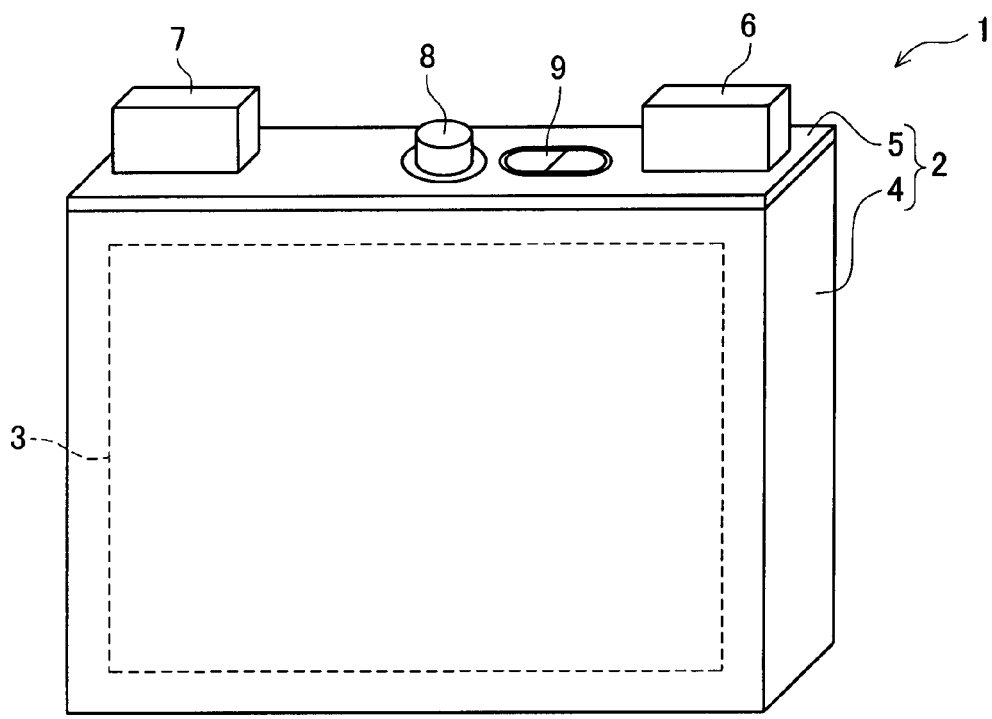
FIG. 1 is a perspective view of a sealed battery in a present embodiment.

Hereinafter, embodiments of the present invention will be described in detail with reference to the accompanying drawings. In this embodiment, the present invention is applied to a sealed battery 1 shown in FIG. 1. The sealed battery 1 of FIG. 1 has a power generating element 3 sealed inside a flat-shaped battery container 2. The battery container 2 is formed of a case body 4 and a lid member 5. The power generating element 3 is a wound electrode body of positive and negative electrodes superposed and wound around with separators (or laminated electrode body). The power generating element 3 inside the sealed battery 1 is impregnated with liquid electrolyte.

Figure 2:
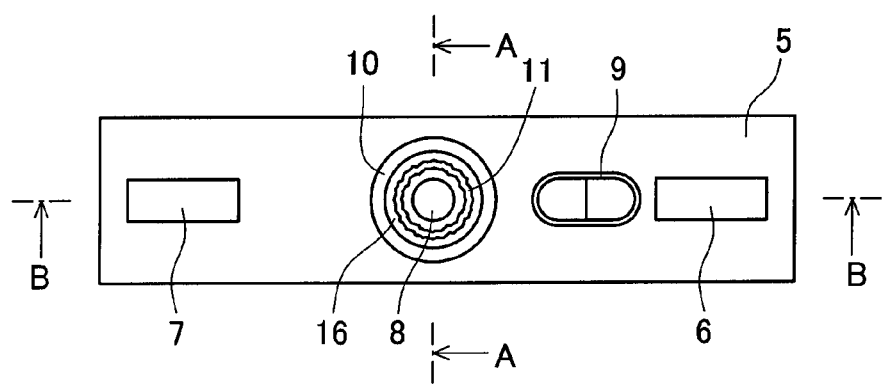
FIG. 2 is a plan view of a lid member of the sealed battery in the present embodiment.

The case body 4 is a case with a rectangular cross section. The case body 4 itself is open at the top in FIG. 1, but closed and hermetically sealed with the lid member 5. A positive terminal 6, a negative terminal 7, and a sealing cap 8 are mounted to the lid member 5. A safety vent 9 is also formed. A plan view of the lid member 5 is shown in FIG. 2. FIG. 2 shows a surface on the outer side of the sealed battery 1 of the lid member 5. The positive terminal 6 and the negative terminal 7 are generally positioned near both ends of the lid member 5 in the left and right direction in FIG. 2. The sealing cap 8 is disposed at the center in the left and right direction in FIG. 2 of the lid member 5. The safety vent 9 is formed at a position between the positive terminal 6 and the sealing cap 8. An annular ridge 16 is formed around the sealing cap 8 in FIG. 2. Weld beads 11 are formed in an annular shape inside a groove 10. The weld beads 11 are marks left after welding the circumference of the sealing cap 8 to the lid member 5. The case body 4, the lid member 5, and the sealing cap 8 are all made of metal. However, the case body 4 need not necessarily be made of metal.

Figure 3:
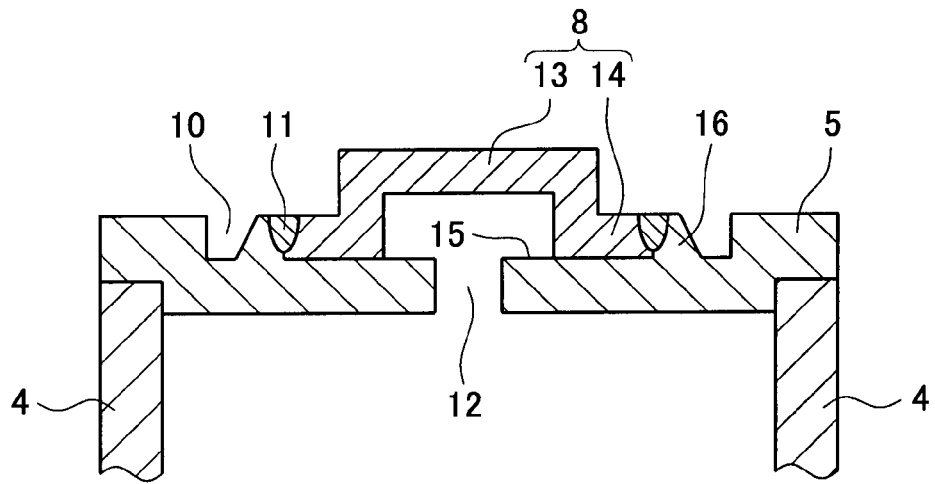
FIG. 3 is a cross sectional view of the lid member and a sealing cap.

A cross section of the lid member 5 at A-A in FIG. 2 is shown in FIG. 3. FIG. 3 also shows part of the case body 4. As shown in FIG. 3, a through hole 12 is formed in the lid member 5. The through hole 12 is positioned generally at the center of the lid member 5 in FIG. 2, below the sealing cap 8. Note that, in FIG. 2 or 1, the through hole 12 is hidden by the sealing cap 8 and not visible. The through hole 12 is a fill opening through which liquid electrolyte is introduced into the battery container (hereinafter referred to as "fill opening 12"), which is closed with the sealing cap 8 after the introduction of liquid. The sealing cap 8 has a dome-like cap 13 and an annular flange 14 therearound. Weld beads 11 are formed along the entire circumference of the flange 14 of the sealing cap 8. Outside the weld beads 11 is the annular ridge 16 of the lid member 5, and the groove 10 is positioned on the outside thereof.

Figure 4:
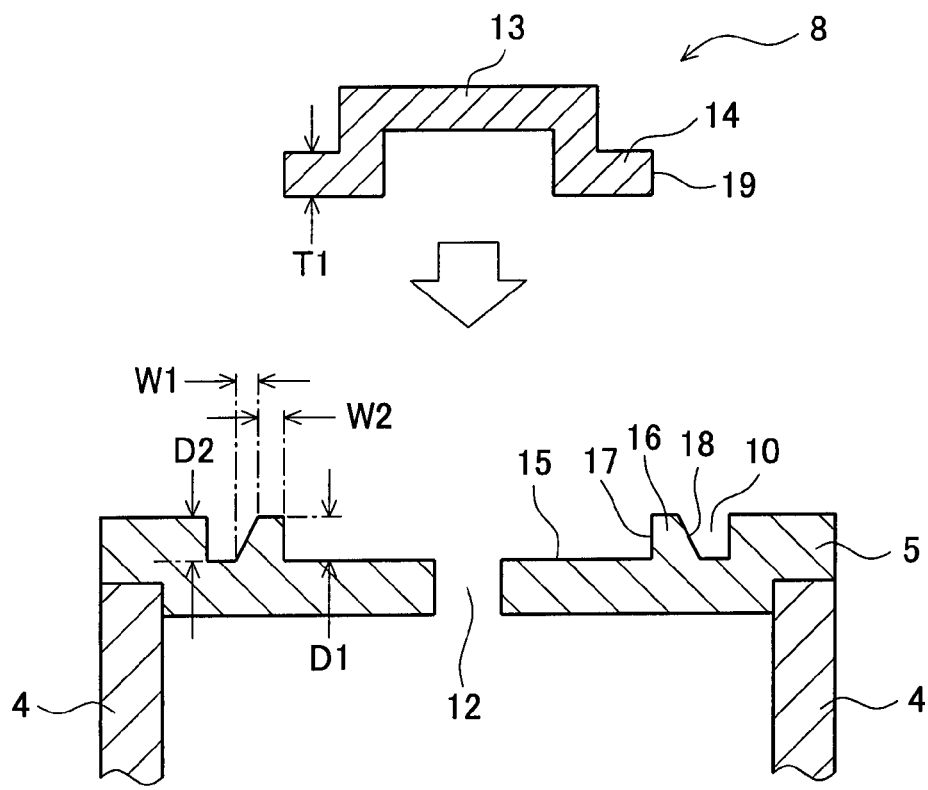
FIG. 4 is a cross sectional view of the lid member and the sealing cap before welding.

A cross section of the lid member 5 and the sealing cap 8 shown in FIG. 3 before welding is shown in FIG. 4. As shown in FIG. 4, an annular recess 15 is formed in the upper surface in the drawing, i.e., in the surface on the outer side of the sealed battery 1, of the lid member 5 before welding. The above-mentioned fill opening 12 is positioned at the center of the annular recess 15. The region between the annular recess 15 and the groove 10 forms the annular ridge 16. The sealing cap 8 is designed such that the outer circumference 19 of its flange 14 snugly fits with the wall surface 17 between the annular recess 15 and the annular ridge 16. The depth D1 of the annular recess 15 is equal to the thickness T1 of the flange 14. Namely, when the sealing cap 8 is set in the annular recess 15, the annular ridge 16 and the flange 14 are coplanar with each other.

The wall surface 18 between the annular ridge 16 and the groove 10 may be a vertical wall surface, or an inclined surface, with the ridge having a smaller diameter at the top and a larger diameter at the bottom. An inclined surface is adopted in the example of FIG. 4. The inclination width (difference between the upper and lower radii) W1 should preferably be within the range of 10 to 100% of the depth D1 of the annular recess 15. Namely, if the inclination width W1 is too small, i.e., if the wall surface 18 has too steep a gradient, the annular ridge 16 may not be able to have sufficient strength if it has a small width W2 at the top. On the contrary, if the inclination angle W1 is too large, i.e., if the wall surface 18 has too low a gradient, it cannot provide much advantage over a design that does not include the groove 10.

The groove 10 has a depth D2 within the range of 40 to 100% of the depth D1 of the annular recess 15 (100% in the example of FIG. 4). If the groove 10 is too shallow, not much effect of the groove 10 can be expected. On the contrary, if the groove 10 is made too deep, the lid member 5 itself may have insufficient strength. The width W2 at the top of the annular ridge 16 is smaller than the depth D1 of the annular recess 15. If the width W2 is larger than the depth D1 of the annular recess 15, the groove 10 will be too far away from the weld point. The groove 10 can then not provide a satisfactory effect and weld quality may vary depending on the direction.

The manufacturing procedure of the sealed battery 1 using the lid member 5 and the sealing cap 8 having the above-described structures is roughly described as follows:

1. Insertion of wound electrode body
2. Introduction of liquid
3. Sealing of fill opening In the part "1." above, the wound electrode body is inserted into the case body 4. Therefore, the wound electrode body which will form the power generating element 3 is connected to the positive terminal 6 and the negative terminal 7 of the lid member 5 beforehand. The sealing cap 8 is not yet set on the lid member 5 at this stage. The wound electrode body is then inserted into the case body 4, and the lid member 5 is set such that its periphery fits in the opening of the case body 4. The seam between the case body 4 and the lid member 5 is welded all around. When the case body 4 is not made of metal, the case body 4 and the lid member 5 are joined together by other means than welding. Thereby an assembly having a similar appearance to the one shown in FIG. 1 except that it is without the sealing cap 8 is obtained. In this state, the annular recess 15 and the fill opening 12 at its center are exposed.

Next, in the part "2.", liquid is introduced. Namely, liquid electrolyte is poured into the battery container 2 formed of the case body 4 and the lid member 5, using the exposed fill opening 12. The poured liquid electrolyte infiltrates the wound electrode body, thereby making the wound electrode body capable of generating power.

Then, in the part "3.", sealing is performed. Namely, the sealing cap 8 is set in the annular recess 15 of the lid member 5, and the entire circumference of the flange 14 of the sealing cap 8 is welded to the wall surface 17 of the annular ridge 16 of the lid member 5. Any known welding techniques such as laser welding, electron beam welding, or the like may be used. Thereby, weld beads 11 shown in FIGS. 2 and 3 are formed. The fill opening 12 is closed, so that the power generating element 3 inside is sealed. This state is the one shown in FIG. 1. The sealed battery 1 is thus produced.

Next, the effect of the annular groove 10 formed in the lid member 5, in the sealed battery 1 and the manufacturing method thereof described above, will be described. The effect achieved by the presence of the groove 10 is to reduce variation of the effective thermal capacity of the lid member 5 during welding depending on the direction and to make it more uniform.

Figure 5:
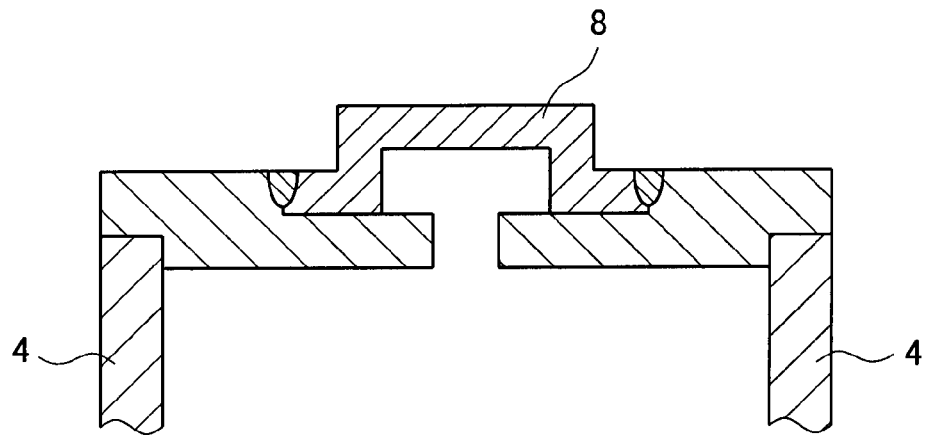
FIG. 5 is a cross sectional view of a lid member and a sealing cap (Comparative example) with no groove.

If there is no groove 10 as shown in FIG. 5, the effective thermal capacity of the lid member 5 during welding varies largely depending on the direction. This is because, as is clear from FIG. 2, the distance from the weld point (i.e., where weld beads 11 are formed) to the periphery of the lid member 5 varies largely depending on the direction. Also, whether or not other structures are present differs depending on the direction on the lid member 5. For example, while the safety vent 9 is formed on the right side of the sealing cap 8, there is no corresponding component on the left side. Therefore, the heat input to the weld point is diffused in various degrees depending on the direction, leading to the problem described in the section of [Problems to be solved by the invention].

On the other hand, in this embodiment, the groove 10 is provided in an annular form around the annular recess 15 to alleviate this problem. Namely, as understood from FIG. 3, the lid member 5 has a reduced thickness in the groove 10 than other parts by the depth D2 of the groove 10. Therefore, the groove 10 acts as resistance when heat input to the weld point is transferred toward the periphery of the lid member 5.

Accordingly, of the heat input to the annular ridge 16 of the lid member 5 by welding, the amount of heat transferred to the outside of the groove 10 through the bottom of the groove 10 is small. As a result, the structures outside the groove 10 contribute less to the effective thermal capacity of the lid member 5 during welding. Also, the heat input to the annular ridge 16 is diffused to the atmosphere primarily from the wall surface 18 between the annular ridge 16 and the groove 10. The shape of the wall surface 18 and the distance thereto from weld points is uniform irrespective of the direction. Therefore, the effective thermal capacity of the lid member 5 during welding is made substantially uniform irrespective of the direction.

For this reason, when welding is performed around the entire circumference under the same welding conditions, the width and depth of the weld beads 11 are substantially uniform around the entire circumference. Therefore, welding conditions need not be changed depending on the direction. Welding can be performed favorably around the entire circumference under the same welding conditions.

This was verified through a test as described below. In this test, four types of test pieces specified in Table 1 with respect to W1 and W2 in FIG. 4 were prepared and used. Other than W1 and W2, the test pieces all had the following dimensions for the respective parts:
D1: 0.50 mm
D2: 0.25 mm

TABLE 1

|  | Comparative EXAMPLE | EXAMPLE 1 | EXAMPLE 2 | EXAMPLE 3 |
|---|---|---|---|---|
| W1 (mm) | — | 0.00 | 0.00 | 0.20 |
| W2 (mm) | — | 0.30 | 0.70 | 0.30 |

These four types of test pieces are designed as described below:
Comparative Example: No groove 10 (see FIG. 5)
Example 1: Vertical wall surface 18, and W2 smaller than D1
Example 2: Vertical wall surface 18, and W2 larger than D1
Example 3: Inclined wall surface 18, and W2 smaller than D1

Figure 6:
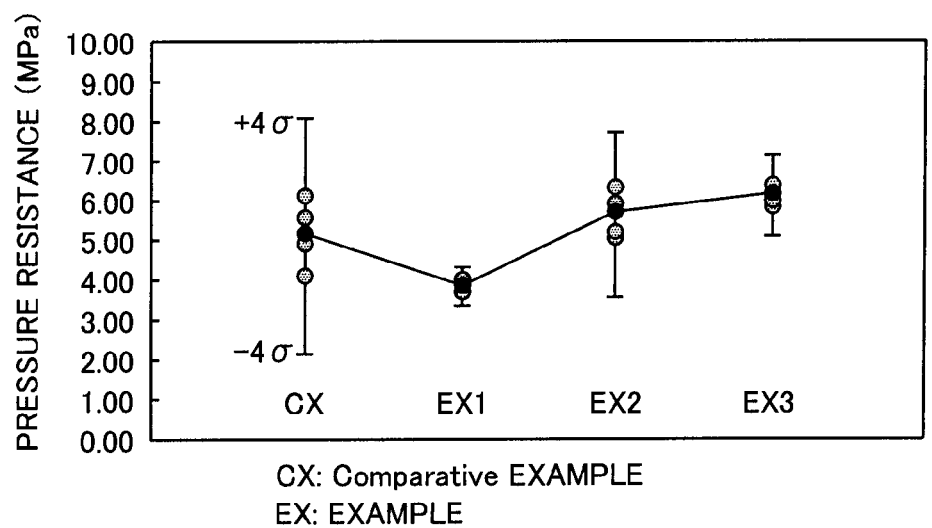
FIG. 6 is a graph obtained by plotting results of pressure resistance test in Comparative example and Examples.

In the test, five test pieces were prepared respectively for each type, and the sealing caps 8 were respectively welded. The welding conditions were the same for all the test pieces. After welding, pressure resistance was measured. The measurement results of the test pieces, and mean values and variations (4σ) of each type were as shown in Table 2. The unit is MPa. FIG. 6 is the graph obtained by plotting these results.

TABLE 2

|  |  | Comparative EXAMPLE | EXAMPLE 1 | EXAMPLE 2 | EXAMPLE 3 |
|---|---|---|---|---|---|
| Measurement Result of Each Test Piece | Test Piece 1 | 6.17 | 3.90 | 5.10 | 5.81 |
|  | Test Piece 2 | 4.25 | 3.82 | 5.83 | 6.17 |
|  | Test Piece 3 | 5.11 | 3.97 | 5.25 | 6.35 |
|  | Test Piece 4 | 5.67 | 4.10 | 6.34 | 5.91 |
|  | Test Piece 5 | 4.99 | 4.00 | 5.91 | 6.38 |
| Mean Value |  | 5.24 | 3.96 | 5.69 | 6.12 |
| Variation (4σ) |  | 0.72 | 0.11 | 0.51 | 0.25 |

TABLE 3

|  | Comparative EXAMPLE | EXAMPLE 1 | EXAMPLE 2 | EXAMPLE 3 |
|---|---|---|---|---|
| Mean Melted Depth (mm) | 0.41 | 0.46 | 0.43 | 0.45 |
| Variation (4σ, mm) | 0.29 | 0.11 | 0.19 | 0.13 |

Figure 7:
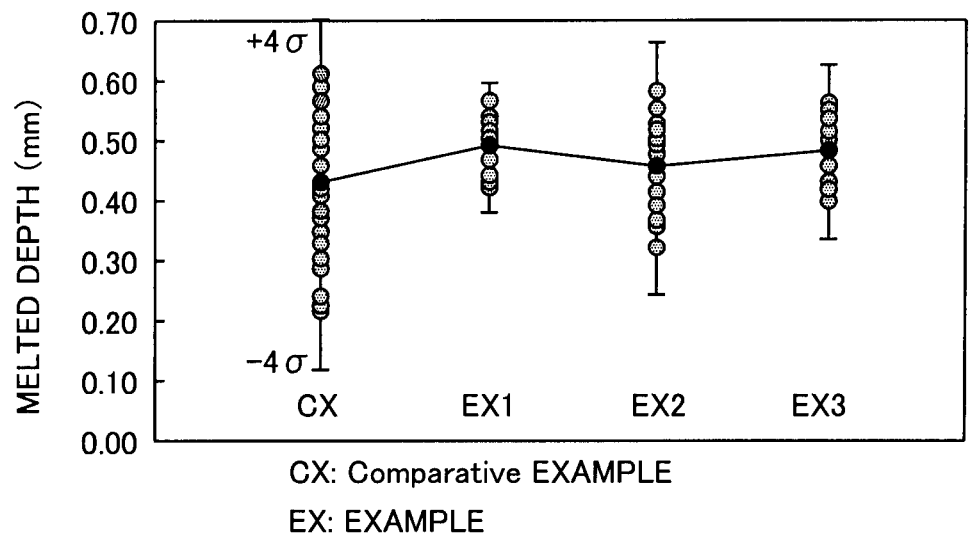
FIG. 7 is a graph obtained by plotting measurement results of the depth of weld beads in Comparative example and Examples.

To evaluate the quality of the weld points themselves, the depth of the weld beads 11 formed by welding was measured with respect to one of the test pieces of respective types. The number of weld spots per one test piece was 140 around the entire circumference. The depth was measured at these 140 points, and mean values and variations (4σ) were determined. The results are shown in Table 3. FIG. 7 is the graph obtained by plotting these results.

These results indicate the following:

Comparative EXAMPLE showed larger variations both in welds and pressure resistance than EXAMPLES 1 to 3. This is assumed to be because of the variation in the effective thermal capacity depending on the direction for the reasons described above, due to the lack of the groove 10.

EXAMPLE 1 showed smallest variations both in welds and pressure resistance of all the four types of test pieces. This is due to the effect of the groove 10. However, the pressure resistance itself of EXAMPLE 1 was the lowest of the four types of test pieces. This is assumed to be because of the shape of the annular ridge 16 being thin in the radial direction with the wall surface 18 on the outer side standing upright, whereby the annular ridge 16 itself was somewhat weaker than the others. In fact, the test piece after the pressure test showed fracture of the annular ridge 16 instead of pull-out failure of the weld point. Nevertheless, this level of pressure resistance is not necessarily insufficient depending on the application of the sealed battery 1. It is a practicable level in applications where a large current is seldom applied, or where the battery has ample cooling means. The merit of smaller variations in welds is greater.

EXAMPLE 2 is superior to EXAMPLE 1 in pressure resistance. This is attributable to the higher strength of the annular ridge 16 itself as compared to that of EXAMPLE 1 due to the large thickness of the annular ridge 16 in the radial direction. It showed an even larger pressure resistance than Comparative EXAMPLE. On the other hand, it showed larger variations in welds and pressure resistance as compared to EXAMPLE 1. Still, the effect of the groove 10 is discernible since the variations in welds and pressure resistance are smaller as compared to Comparative EXAMPLE.

Variations in welds and pressure resistance of EXAMPLE 3 were between those of EXAMPLE 1 and EXAMPLE 2. Its variations in welds and pressure resistance are significantly smaller than those of Comparative EXAMPLE, and therefore EXAMPLE 3 can be considered to be excellent in uniformity. It showed a higher pressure resistance than EXAMPLE 2 and excellent in this respect, too. As compared to that of Example 1, the annular ridge 16 of Example 3 had a shape with the same top width (W2→W2) and a larger bottom width (W2→W1+W2). This leads us to assume that the pressure resistance after welding is determined primarily by the bottom width of the annular ridge 16. In addition, the top width being not large contributes to its superiority to EXAMPLE 2 in terms of variation. Namely, the wall surface 18 of the annular ridge 16 being an inclined surface has enabled the increase in strength of the annular ridge 16 without enlarging the top width W2.

Figure 8:
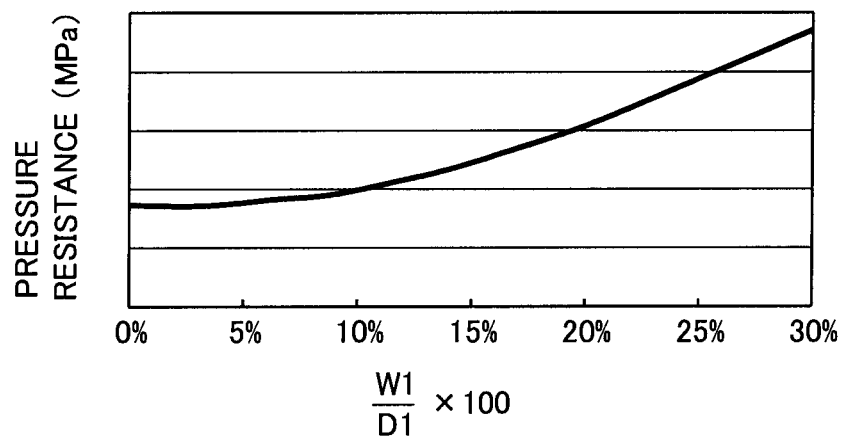
FIG. 8 is a graph showing simulation results of a relationship between "W1" in FIG. 4 and pressure resistance after welding.

Next, the examination result of the relationship between the inclination width W1 of the wall surface 18 of the annular ridge 16 and the pressure resistance after welding obtained through simulation of material mechanics will be described. The result was as shown in the graph of FIG. 8. The horizontal axis of this graph represents the percent of inclination width W1 to depth D1 of the annular recess 15. Note that, the joint strength of the weld point was ignored in this simulation for simplicity's sake, so that the result can be considered to indicate the computational strength of the annular ridge 16 itself. FIG. 8 shows that the pressure resistance increases as W1 increases relative to D1. More specifically, there is a significant difference if W1 is equal to or more than 10% of D1. More preferably, W1 should be equal to or more than 20% of D1. Since W1 is 40% of D1 in the above-described EXAMPLE 3, it can be said that it provided the effect of inclination more than enough. On the other hand, if W1 is too large so that the wall surface 18 has too low a gradient, there will not be much difference from a design without the groove 10. Therefore W1 should preferably be less than 100% of D1.

Figure 9:
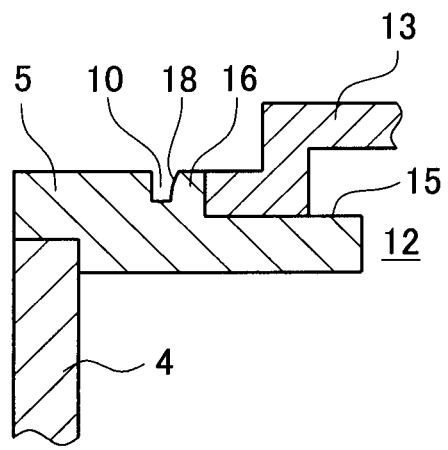
FIG. 9 is a cross sectional view of a lid member and a sealing cap in a (first) modified example of the present embodiment.

A modified example of this embodiment will now be described. In a first modified example shown in FIG. 9, the wall surface 18 of the annular ridge 16 is an inclined surface with a convexly protruding shape in a cross sectional view. The above-described effect of inclination can also be achieved with such a shape. The effect of inclination can be expected to some extent even with an inclined surface having a concavely recessed shape, conversely from that of FIG. 9, in a cross sectional view. Thus, the "inclined surface with a smaller diameter at the top and a larger diameter at the bottom" in the present invention shall include such shapes as these, where the surface is not straight in a cross sectional view. Note that, in FIG. 9, only the part corresponding to the left half of FIG. 3 and others before welding is depicted (same with FIG. 10).

Figure 10:
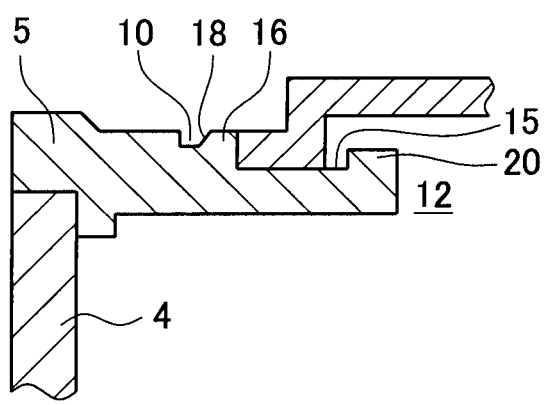
FIG. 10 is a cross sectional view of a lid member and a sealing cap in a (second) modified example of the present embodiment.
Figure 11:
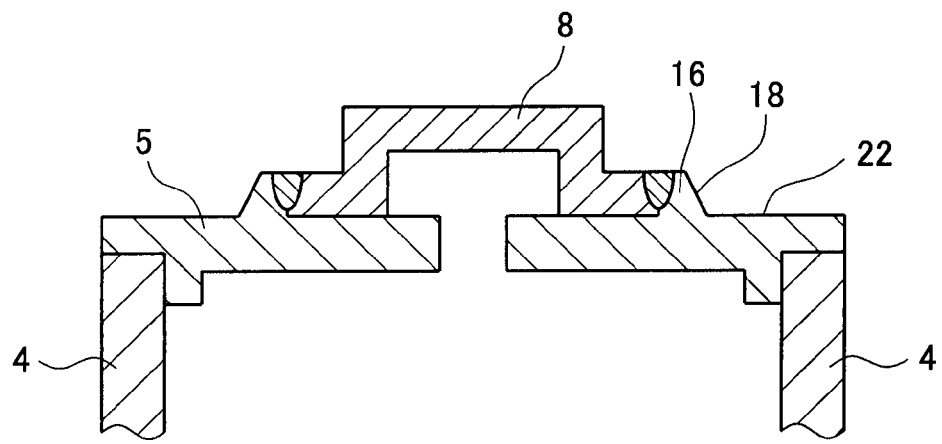
FIG. 11 is a cross sectional view of a lid member and a sealing cap in a (third) modified example of the present embodiment.

In a second modified example shown in FIG. 10, an annular rib 20 is provided on the outer side at the center of the annular recess 15, i.e., around the fill opening 12. In a third modified example shown in FIG. 11, the groove 10 has no outer wall and the part on the outside thereof has a surface coplanar with the bottom surface 22 of the groove 10. It may not be appropriate to call such a design a "groove"; in short, the annular ridge 16 is the essential part.

The groove 10 has been heretofore described as being provided in the surface on the outer side of the lid member 5. The design is not restricted to this; an annular groove may be formed also in a surface on the inner side (hereinafter, inner face) of the lid member 5. This is because the inner face also contributes to the transfer of heat input to the lid member 5 by welding toward the periphery. Although simply drawn in FIG. 3 and others, there are typically various shapes (such as ribs) formed on the inner face of the actual lid member for mounting elements for connection with the power generating element 3 or for reinforcement purposes or the like. These shapes obviously affect the heat transfer and they cannot possibly exist uniformly in all directions relative to the fill opening 12.

Figure 12:
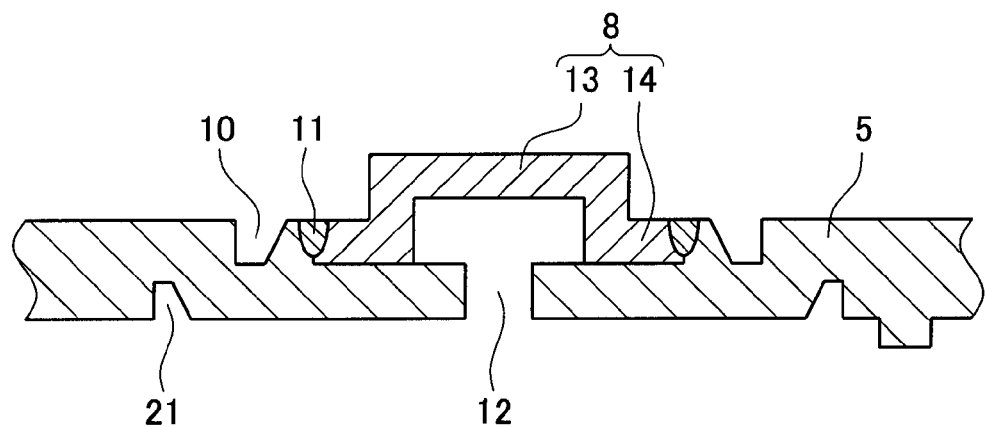
FIG. 12 is a cross sectional view showing an example in which an annular groove is also provided in an inner face of the lid member.

Accordingly, as shown in a fourth modified example of FIG. 12, an annular groove 21 may be provided also in the inner face so as to reduce the effect by the structures on the inner face. Unlike FIG. 3 and others, FIG. 12 is a cross sectional view at B-B of FIG. 2. The groove 21 in the inner face needs to be positioned radially outside the position directly behind the weld point (where weld beads 11 are formed). The groove 10 in the outer face and the groove 21 in the inner face should preferably be provided not at the same positions on the front and the back but at positions displaced from each other. This is for minimizing effects on the strength of the lid member 5. Further, the groove 21 in the inner face should preferably be provided radially outside the groove 10 in the outer face. This is because most of the heat flowing radially outwards in the lid member 5 flows in the outer face near the weld point while the amount of heat flowing near the inner face is small.

Figure 13:
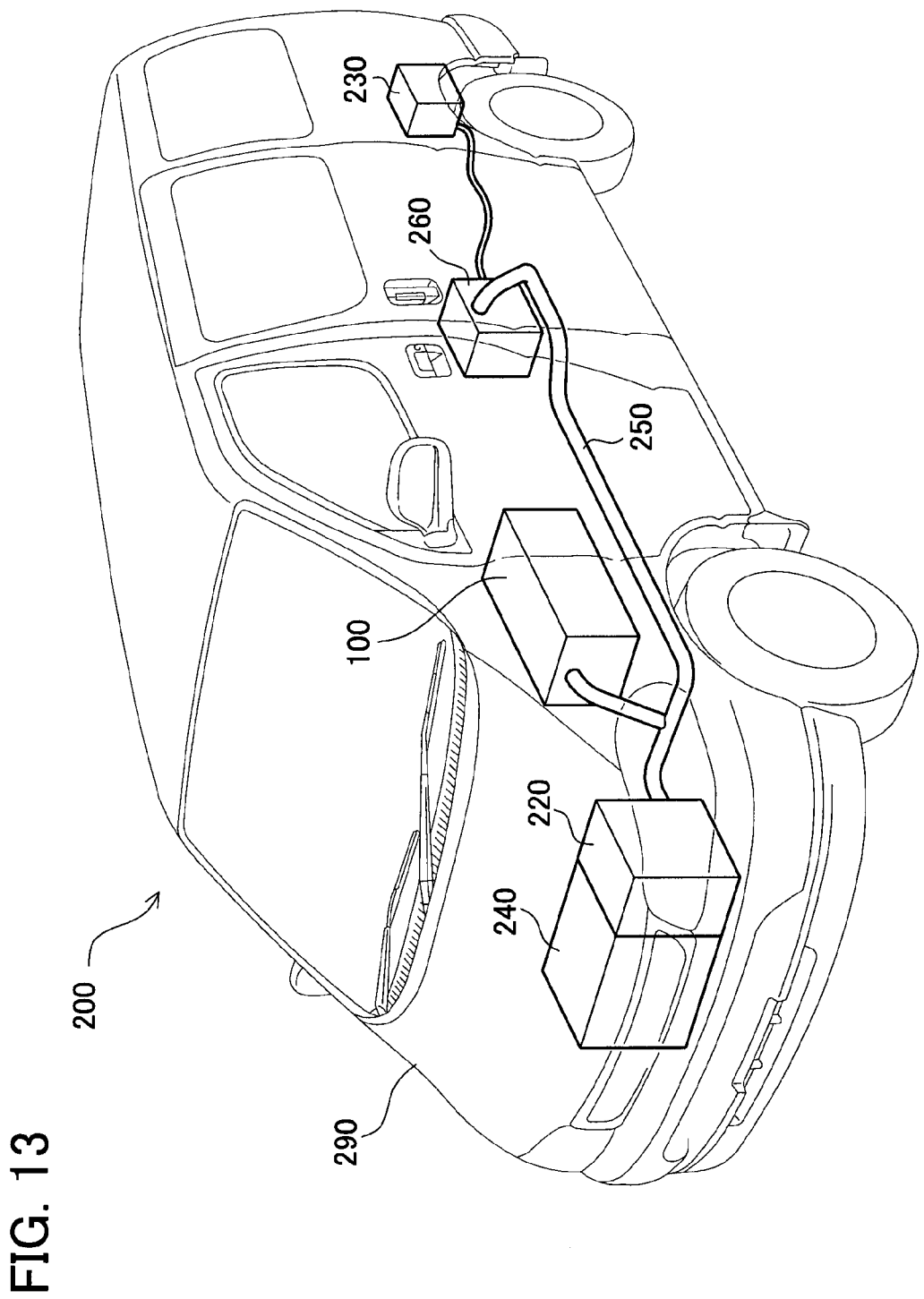
FIG. 13 is a perspective view of a vehicle having a battery pack including the sealed batteries in the present embodiment mounted thereon.

A plurality of the sealed batteries 1 according to the various embodiments described above may be combined and configured as a battery pack and mounted on a vehicle. One example of such a vehicle is shown in FIG. 13. This vehicle 200 is a hybrid car that drives its wheels using a combination of an engine 240, a front motor 220, and a rear motor 230. This vehicle 200 includes a vehicle body 290 and the engine 240, and the front motor 220 attached to the engine, the rear motor 230, a cable 250, an inverter 260, and a battery pack 100 containing therein a plurality of sealed batteries 1. Electric power is supplied from the battery pack 100 through the inverter 260 to the front motor 220 and the rear motor 230.

The vehicle may be any of the vehicles that use electrical energy by batteries for part or all of their power sources, including, for example, electric cars, hybrid cars, plug-in hybrid cars, hybrid railway vehicles, fork lifts, electric wheelchairs, electric bicycles, electric scooters.

Figure 14:
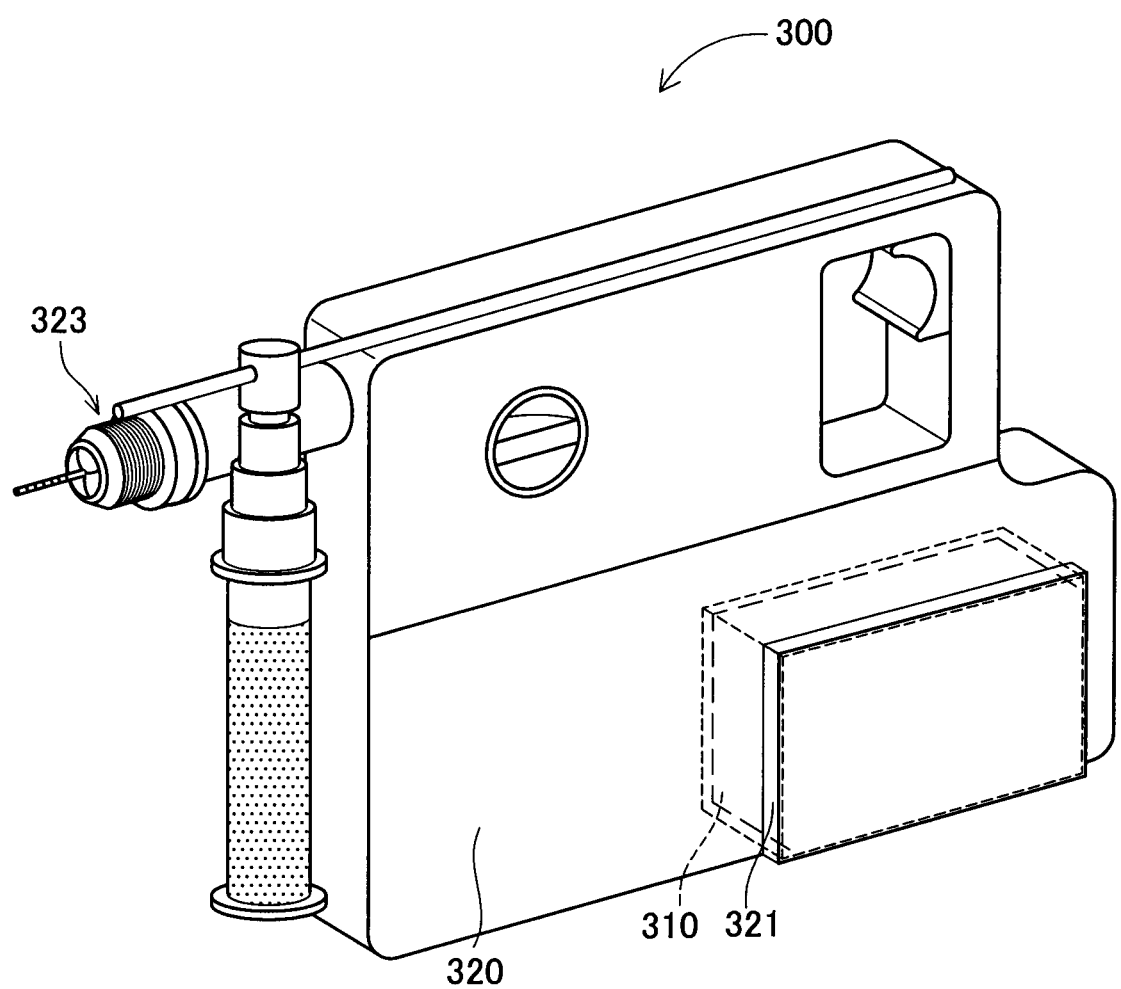
FIG. 14 is a perspective view of a hammer drill having the sealed battery in the present embodiment mounted thereon.

The sealed batteries 1 according to the various embodiments described above may be mounted on various electrical devices. A hammer drill, one example of such an electrical device, is shown in FIG. 14. This hammer drill 300 has a battery pack 310 containing the previously described sealed batteries 1 mounted thereon, i.e., it is a battery-mounted device having the battery pack 310, a main body 320, and an operating part 323. Electric power is supplied from the battery pack 310 to the operating part 323. The battery pack 310 is removably accommodated in a bottom part 321 of the main body 320 of the hammer drill 300.

The battery-mounted device may be any of the devices that have a battery mounted thereon and use it at least as one of their energy sources, including, for example, various battery-powered domestic and office appliances and industrial equipment, such as personal computers, mobile phones, battery-powered electric tools, uninterruptible power supplies.

As described above in detail, according to the embodiments, the annular groove 10 is provided around the entire circumference of the fill opening 12 of the lid member 5. This prevents the shapes and structures outside the annular groove 10 of the lid member 5 from largely affecting the effective thermal capacity during welding of the sealing cap 8. Thereby, a sealed battery 1, a manufacturing method thereof wherein the fill opening 12 can be closed under constant welding conditions around the entire circumference, and further a vehicle 200 and a device 300 having the sealed battery 1 mounted thereon are realized.

The aforementioned embodiment is a mere example and does not give any restriction to the present invention. Thus, the present invention may be embodied in other specific forms without departing from the essential characteristics thereof. For instance, the sealing cap 8 may be designed to be flat without a cap 13, excepting for the example shown in FIG. 10. The entire shape of a sealed battery may be flat or cylindrical. The present invention can also be applied to any configuration to close through holes excepting the fill opening in the lid member of the case body.

DESCRIPTION OF THE REFERENCE SIGNS

1 Sealed battery
2 Battery container
3 Power generating element

4 Case body
5 Lid member
8 Sealing cap
10 Groove
12 Fill opening
15 Annular recess
16 Annular ridge
17 Wall surface (Inner wall surface)
18 Wall surface (Outer wall surface)
21 Groove

The invention claimed is:

1. A sealed battery including: a battery container; and a power generating element sealed inside the battery container,
wherein the battery container is provided with an opening, an annular ridge extending around an entire circumference on an outer face of the opening, and an annular recess inside an inner wall surface of the annular ridge,
an outer wall surface of the annular ridge is an inclined surface configured so that the ridge has a smaller diameter at a top and a larger diameter at a bottom,
the battery further includes a sealing member fitted into the annular recess to cover the opening, and
the sealing member is joined by welding along an entire circumference thereof to the inner wall surface of the annular ridge.

2. The sealed battery according to claim 1, wherein a difference in radius between the top and the bottom of the inclined surface is equal to or more than 10% of a height of the inner wall surface of the annular ridge.

3. The sealed battery according to claim 2, further including an annular groove outside the outer wall surface of the annular ridge.

4. The sealed battery according to claim 1, further including an annular groove outside the outer wall surface of the annular ridge.

5. The sealed battery according to claim 1, wherein a radial width at a top of the annular ridge is smaller than a height of the inner wall surface of the annular ridge.

6. The sealed battery according to claim 1, wherein a height of the outer wall surface of the annular ridge is within a range of 40% to 100% of a height of the inner wall surface of the annular ridge.

7. A vehicle including:
a motor for driving wheels with electric power supplied thereto; and
a power source part for supplying electric power to the motor,
the power source part including the sealed battery according to claim 1.

8. A device including:
an operating part operating with electric power supplied thereto; and
a power source part for supplying electric power to the operating part,
the power source part including the sealed battery according to claim 1.

9. A sealed battery including: a battery container; and a power generating element sealed inside the battery container,
wherein the battery container is provided with an opening, an annular ridge extending around an entire circumference on an outer face of the opening, an annular recess inside an inner wall surface of the annular ridge, and an annular groove formed around an entire circumference on an inner face of the opening and located radially outside a position directly behind the inner wall surface of the annular ridge,
the battery further includes a sealing member fitted into the annular recess to cover the opening, and
the sealing member is joined by welding along an entire circumference thereof to the inner wall surface of the annular ridge.

10. The sealed battery according to claim 9, further including an annular groove outside the outer wall surface of the annular ridge.

11. The sealed battery according to claim 9, wherein a radial width at a top of the annular ridge is smaller than a height of the inner wall surface of the annular ridge.

12. The sealed battery according to claim 9, wherein a height of the outer wall surface of the annular ridge is within a range of 40% to 100% of a height of the inner wall surface of the annular ridge.

13. A vehicle including:
a motor for driving wheels with electric power supplied thereto; and
a power source part for supplying electric power to the motor,
the power source part including the sealed battery according to claim 9.

14. A device including:
an operating part operating with electric power supplied thereto; and
a power source part for supplying electric power to the operating part,
the power source part including the sealed battery according to claim 9.

15. A method of manufacturing a sealed battery having a power generating element sealed inside a battery container, the method including:
providing the battery container, the battery container including an opening, an annular ridge extending around an entire circumference on an outer face of the opening, and an annular recess inside an inner wall surface of the annular ridge, and an outer wall surface of the annular ridge being an inclined surface configured so that the ridge has a smaller diameter at a top and a larger diameter at a bottom;
fitting a sealing member for covering the opening into the inner wall surface of the annular ridge; and
joining the sealing member to the inner wall surface of the annular ridge by welding along an entire circumference of the sealing member.

16. A method of manufacturing a sealed battery having a power generating element sealed inside a battery container, the method including:
providing the battery container, the battery container including an opening, an annular ridge extending around an entire circumference on an outer face of the opening, an annular recess inside an inner wall surface of the annular ridge, and an annular groove formed around an entire circumference on an inner face of the opening and located radially outside a position directly behind the inner wall surface of the annular ridge;
fitting a sealing member for covering the opening into the inner wall surface of the annular ridge; and
joining the sealing member to the inner wall surface of the annular ridge by welding along an entire circumference of the sealing member.

* * * * *